US012221743B2

(12) United States Patent
Scheckelhoff

(10) Patent No.: US 12,221,743 B2
(45) Date of Patent: Feb. 11, 2025

(54) DEFAULT EXTENDED TUMBLE ACTIVATION IN DRYER APPLIANCES

(71) Applicant: Haier US Appliance Solutions, Inc., Wilmington, DE (US)

(72) Inventor: Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 725 days.

(21) Appl. No.: 17/500,450

(22) Filed: Oct. 13, 2021

(65) Prior Publication Data

US 2023/0113043 A1    Apr. 13, 2023

(51) Int. Cl.
| D06F 58/46 | (2020.01) |
| D06F 34/04 | (2020.01) |
| D06F 105/56 | (2020.01) |
| G05B 13/02 | (2006.01) |

(52) U.S. Cl.
CPC ............. *D06F 58/46* (2020.02); *D06F 34/04* (2020.02); *G05B 13/024* (2013.01); *D06F 2105/56* (2020.02)

(58) Field of Classification Search
CPC ...... D06F 58/46; D06F 34/04; D06F 2105/56; G05B 13/024
USPC .......................................................... 34/318
See application file for complete search history.

(56) References Cited

U.S. PATENT DOCUMENTS

| 8,832,966 | B2 * | 9/2014 | Ashrafzadeh | D06F 33/00 |
| | | | | 34/494 |
| 9,249,539 | B2 * | 2/2016 | Hubig | D06F 34/18 |
| 9,372,031 | B2 * | 6/2016 | Contarini | F26B 21/086 |
| 9,803,306 | B2 * | 10/2017 | Yoo | D06F 35/007 |
| 10,294,600 | B2 | 5/2019 | Beals | |
| 10,968,555 | B2 * | 4/2021 | Lee | D06F 34/18 |
| 11,028,514 | B2 * | 6/2021 | Clara | D06F 33/36 |
| 11,739,470 | B2 * | 8/2023 | Lee | D06F 39/04 |
| | | | | 68/12.03 |
| 2005/0188471 | A1 * | 9/2005 | Ahn | D06F 25/00 |
| | | | | 8/158 |
| 2010/0050464 | A1 | 3/2010 | Krzelowski | |
| 2010/0205823 | A1 * | 8/2010 | Ashrafzadeh | D06F 33/00 |
| | | | | 34/445 |
| 2015/0368840 | A1 | 12/2015 | Pollett | |
| 2020/0190725 | A1 * | 6/2020 | Lee | D06F 34/28 |
| 2023/0113043 | A1 * | 4/2023 | Scheckelhoff | G05B 13/024 |
| | | | | 34/318 |
| 2024/0133103 | A1 * | 4/2024 | Leonard | D06F 33/37 |

FOREIGN PATENT DOCUMENTS

| AU | 2005200711 A1 * | 9/2005 | ............. D06F 25/00 |
| EP | 2581483 A1 * | 4/2013 | ............. D06F 18/00 |
| EP | 3666958 A1 * | 6/2020 | ............. D06F 25/00 |

* cited by examiner

*Primary Examiner* — Stephen M Gravini
(74) *Attorney, Agent, or Firm* — Dority & Manning, P.A.

(57) ABSTRACT

A method for operating a dryer appliance includes, after drying articles within the dryer appliance, receiving data corresponding to an activation signal for an extended tumble from a remote user device, tracking a number of cycles for which the extended tumble is not a default setting for the dryer appliance, and automatically adjusting the extended tumble to the default setting for the dryer appliance or transmitting data corresponding to an extended tumble alert based on the tracked number of cycles.

18 Claims, 5 Drawing Sheets

DEFAULT EXTENDED TUMBLE ACTIVATION IN DRYER APPLIANCES

FIELD OF THE INVENTION

The present subject matter relates generally to dryer appliances and extending tumbling with dryer appliances.

BACKGROUND OF THE INVENTION

Dryer appliances generally include a cabinet with a drum rotatably mounted therein. During operation, a motor rotates the drum, e.g., to tumble articles located within the drum. Dryer appliances may also include a heater assembly that passes heated air through the drum in order to dry moisture-laden articles positioned therein.

Dryer appliances generally dry articles during a drying cycle, and a user may remove the dried articles from the drum after the drying cycle is complete. The user may be available to immediately remove the articles from the drum at the end of the drying cycle. At other times, the user may be away from the dryer appliance and unavailable to immediately remove the articles from the drum. Articles that remain within the drum after the drying cycle for an extended period of time may undesirably rest and wrinkle.

Certain dryer appliances include an extended tumble cycle that continues to rotate the drum at the end of the drying cycle. The extended tumble cycles may prevent articles within the drum from resting and wrinkling. However, educating users regarding the extended tumble cycle and how to activate the extended tumble cycle can be difficult.

BRIEF DESCRIPTION OF THE INVENTION

Advantages of the invention will be set forth in part in the following description, or may be apparent from the description, or may be learned through practice of the invention.

In an example embodiment, a method for operating a dryer appliance includes, after drying articles within the dryer appliance, receiving data corresponding to an activation signal for an extended tumble from a remote user device, determining whether the extended tumble is a default setting for the dryer appliance, in response to determining that the extended tumble is not the default setting for the dryer appliance, incrementing a counter, and automatically adjusting the extended tumble to the default setting for the dryer appliance when the counter is greater than a threshold number.

In another example embodiment, a method for operating a dryer appliance includes, after drying articles within the dryer appliance, receiving data corresponding to an activation signal for an extended tumble from a remote user device, determining whether the extended tumble is a default setting for the dryer appliance, in response to determining that the extended tumble is not the default setting for the dryer appliance, incrementing a counter, and transmitting data corresponding to an extended tumble alert that suggests adjusting the default setting for the dryer appliance when the counter is greater than a threshold number.

In an additional example embodiment, a method for operating a dryer appliance includes receiving data corresponding to a plurality of activation signals for an extended tumble from a remote user device. Each of the plurality of activation signals is received after a respective cycle during which articles are dried within the dryer appliance. The method also includes determining whether the extended tumble is a default setting for the dryer appliance, in response to determining that the extended tumble is not the default setting for the dryer appliance, tracking a number of the cycles for which the extended tumble is not the default setting for the dryer appliance, and, after the number of the cycles for which the extended tumble is not the default setting for the dryer appliance exceeds a threshold, either automatically adjusting the extended tumble to the default setting for the dryer appliance or transmitting data corresponding to an extended tumble alert that suggests adjusting the default setting for the dryer appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
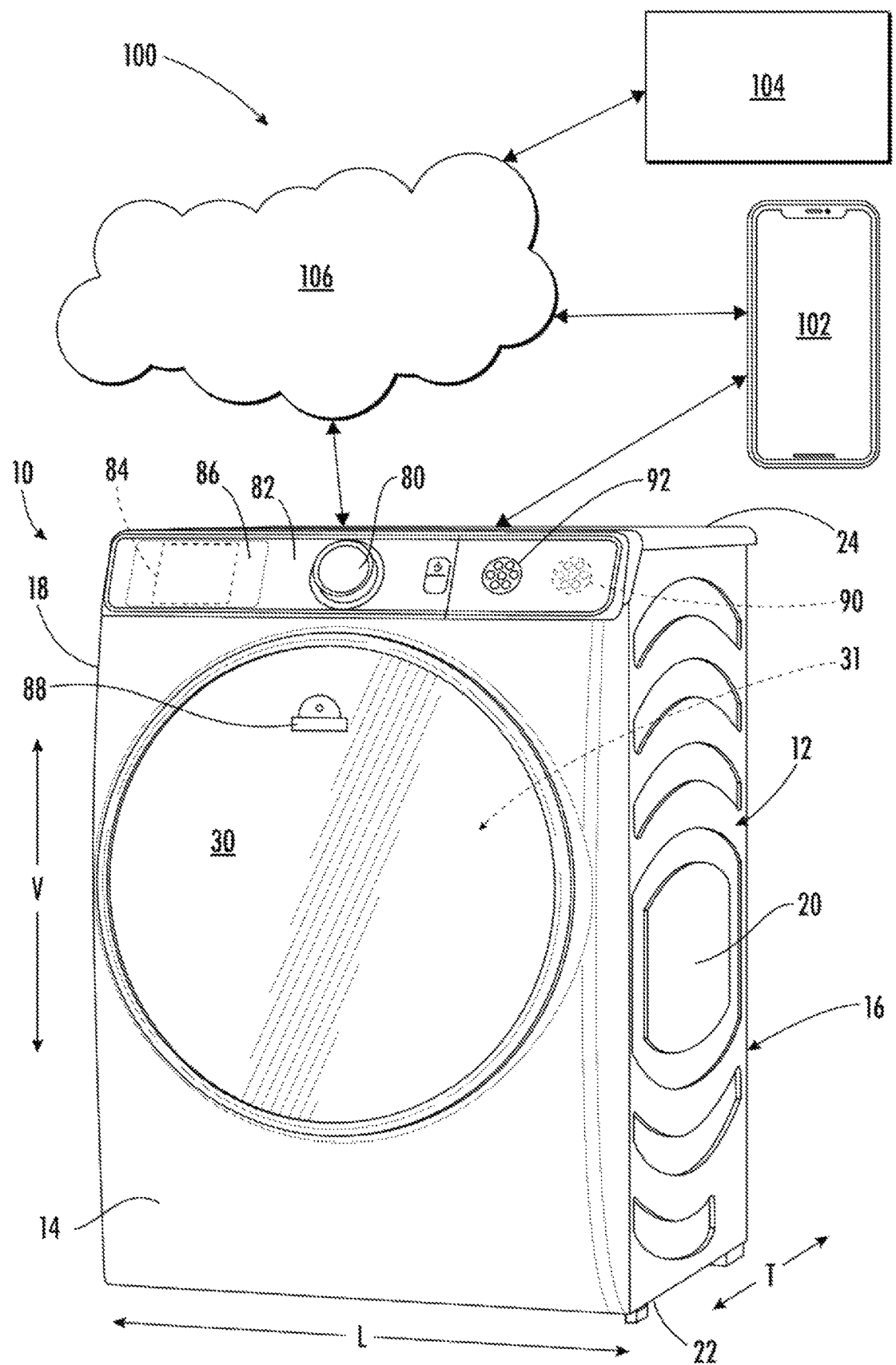
FIG. 1 is a perspective view of a dryer appliance according to an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Figure 2:
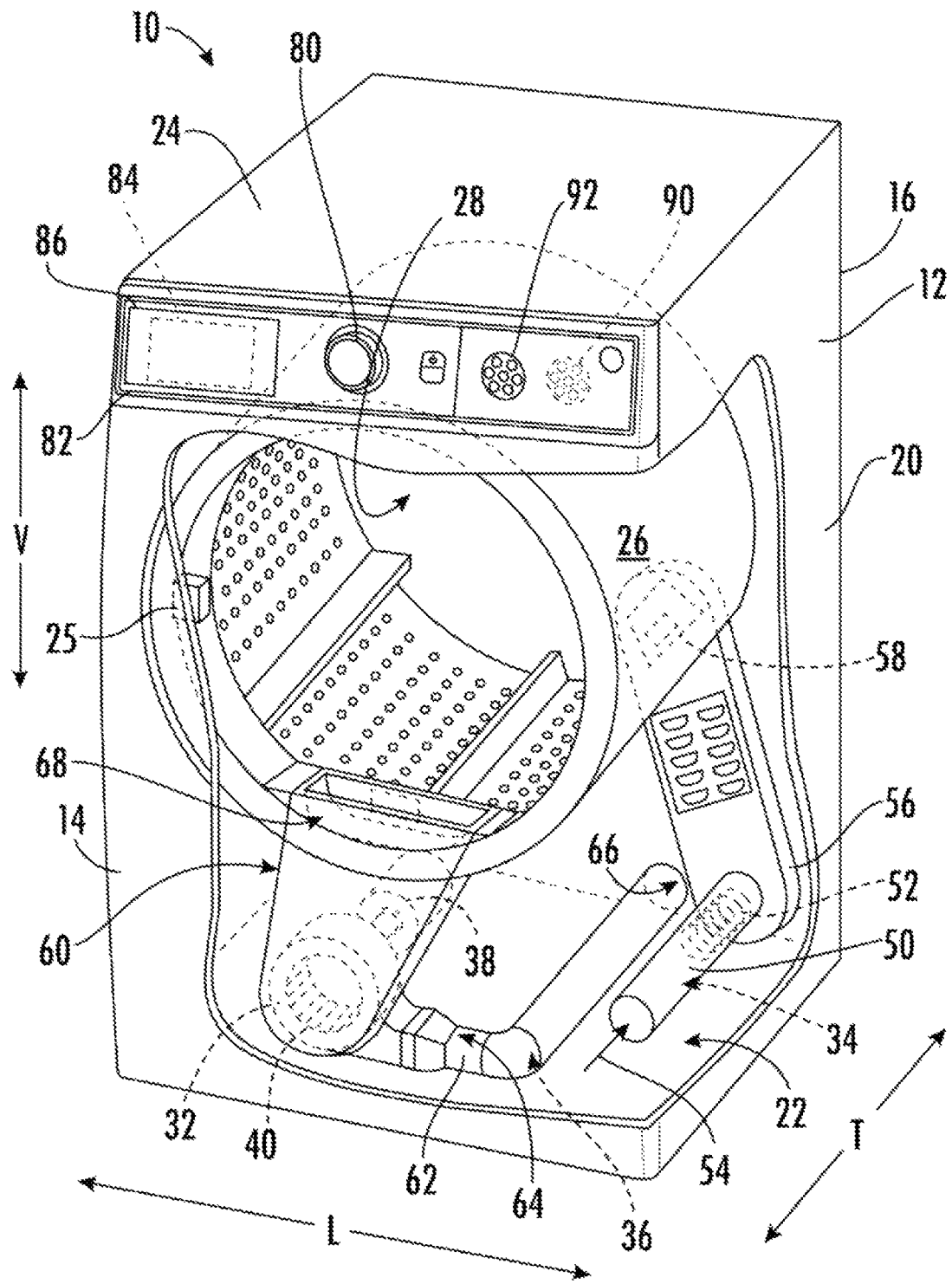
FIG. 2 is a perspective view of the example dryer appliance of FIG. 1 with portions of a cabinet of the exemplary dryer appliance removed to reveal various components of the example dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other laundry appliances, including alternative dryer appliances, front or top-loaded washer appliances, or combination washer/dryer appliances having different appearances and different features may also be utilized with the present subject matter as well.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14 and a rear panel 16 spaced apart along the transverse direction T, a first side panel 18 and a second side panel 20 spaced apart along the lateral direction L, and a bottom panel 22 and a top cover 24 spaced apart along the vertical direction V. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. Rotation of drum 26 is driven by drum motor 27. A door 30 is rotatably mounted to cabinet 12 for providing selective access to drum 26.

As best shown in FIG. 2, an air handler 32, such as a blower or fan, may be provided to motivate an airflow (not shown) through an entrance air passage 34 and an air exhaust passage 36. Specifically, air handler 32 may include a motor 38 which may be in mechanical communication with a blower fan 40, such that motor 38 rotates blower fan 40. Air handler 32 is configured for drawing air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26.

Drum 26 may be configured to receive heated air that has been heated by a heating assembly 50, e.g., in order to dry damp articles disposed within chamber 28 of drum 26. Heating assembly 50 includes a heater 52 that is in thermal communication with chamber 28. For instance, heater 52 may include one or more electrical resistance heating elements or gas burners, for heating air being flowed to chamber 28. As discussed above, during operation of dryer appliance 10, motor 38 rotates fan 40 of air handler 32 such that air handler 32 draws air through chamber 28 of drum 26. In particular, ambient air enters an air entrance passage defined by heating assembly 50 via an entrance 54 due to air handler 32 urging such ambient air into entrance 54. Such ambient air is heated within heating assembly 50 and exits heating assembly 50 as heated air. Air handler 32 draws such heated air through an air entrance passage 34, including inlet duct 56, to drum 26. The heated air enters drum 26 through an outlet 58 of inlet duct 56 positioned at a rear wall of drum 26.

Within chamber 28, the heated air may remove moisture, e.g., from damp articles disposed within chamber 28. This internal air flows in turn from chamber 28 through an outlet assembly positioned within cabinet 12. The outlet assembly generally defines an air exhaust passage 36 and includes a trap duct 60, air handler 32, and an exhaust conduit 62. Exhaust conduit 62 is in fluid communication with trap duct 60 via air handler 32. More specifically, exhaust conduit 62 extends between an exhaust inlet 64 and an exhaust outlet 66. According to the illustrated embodiment, exhaust inlet 64 is positioned downstream of and fluidly coupled to air handler 32, and exhaust outlet 66 is defined in rear panel 16 of cabinet 12. During a dry cycle, internal air flows from chamber 28 through trap duct 60 to air handler 32, e.g., as an outlet flow portion of airflow. As shown, air further flows through air handler 32 and to exhaust conduit 62.

The internal air is exhausted from dryer appliance 10 via exhaust conduit 62. In some embodiments, an external duct (not shown) is provided in fluid communication with exhaust conduit 62. For instance, the external duct may be attached (e.g., directly or indirectly attached) to cabinet 12 at rear panel 16. Any suitable connector (e.g., collar, clamp, etc.) may join the external duct to exhaust conduit 62. In residential environments, the external duct may be in fluid communication with an outdoor environment (e.g., outside of a home or building in which dryer appliance 10 is installed). During a dry cycle, internal air may thus flow from exhaust conduit 62 and through the external duct before being exhausted to the outdoor environment.

In exemplary embodiments, trap duct 60 may include a filter portion 68 which includes a screen filter or other suitable device for removing lint and other particulates as internal air is drawn out of chamber 28. The internal air is drawn through filter portion 68 by air handler 32 before being passed through exhaust conduit 62. After the clothing articles have been dried (or a drying cycle is otherwise completed), the clothing articles are removed from drum 26, e.g., by accessing chamber 28 by opening door 30. The filter portion 68 may further be removable such that a user may collect and dispose of collected lint between drying cycles.

One or more selector inputs 80, such as knobs, buttons, touchscreen interfaces, etc., may be provided on a front control panel 82 and may be in communication with a processing device or controller 84. Signals generated in controller 84 operate motor 38, heating assembly 50, and other system components in response to the position of selector inputs 80. Additionally, a display 86, such as an indicator light or a screen, may be provided on front control panel 82. Display 86 may be in communication with controller 84 and may display information in response to signals from controller 84. Selector inputs 80 and display 86 may be collectively referred to herein as a user interface.

As used herein, "processing device" or "controller" may refer to one or more microprocessors or semiconductor devices and is not restricted necessarily to a single element. The processing device may be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements may store information accessible processing device, including instructions that may be executed by processing device. Optionally, the instructions may be software or any set of instructions and/or data that when executed by the processing device, cause the processing device to perform operations. For certain embodiments, the instructions include a software package configured to operate dryer appliance 10 and execute certain cycles or operating modes.

In addition, referring again to FIG. 1, dryer appliance 10 may generally include an external communication system 100 which is configured for enabling the user to interact with dryer appliance 10 using a remote device 102. Specifically, according to an exemplary embodiment, external communication system 100 is configured for enabling communication between a user, an appliance, and a remote server 104. According to exemplary embodiments, dryer appliance 10 may communicate with a remote device 102 either directly (e.g., through a local area network (LAN), Wi-Fi, Bluetooth, etc.) or indirectly (e.g., via a network 106), as well as with remote server 104, e.g., to receive notifications, provide confirmations, input operational data, transmit messages, etc.

In general, remote device 102 may be any suitable device for providing and/or receiving communications or commands from a user. In this regard, remote device 102 may include, for example, a personal phone, a tablet, a laptop computer, or another mobile device. In addition, or alternatively, communication between the appliance and the user may be achieved directly through an appliance control panel (e.g., control panel 160). In general, network 106 may be any type of communication network. For example, network 106 may include one or more of a wireless network, a wired network, a personal area network, a local area network, a wide area network, the internet, a cellular network, etc. In general, communication with the network may use any of a variety of communication protocols (e.g., TCP/IP, HTTP, SMTP, FTP), encodings or formats (e.g. HTML, XML), and/or protection schemes (e.g., VPN, secure HTTP, SSL).

External communication system 100 is described herein according to an exemplary embodiment of the present subject matter. However, it should be appreciated that the exemplary functions and configurations of external communication system 100 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

In some embodiments, dryer appliance 10 also includes one or more sensors that may be used to facilitate improved operation of dryer appliance. For example, dryer appliance 10 may include one or more temperature sensors which are generally operable to measure internal temperatures in dryer appliance 10. In some embodiments, controller 84 is configured to vary operation profiles of heating assembly 50 based on one or more temperatures detected by the temperature sensors. Dryer appliance 10 may further include a camera 88, e.g., on a window 31 of door 30, that is generally positioned and configured for obtaining images of at least a portion of chamber 28 of dryer appliance 10. Dryer appliance 10 may further include an air flow indicator 90 with an air flow indicator body 92.

While described in the context of a specific embodiment of dryer appliance 10, using the teachings disclosed herein it will be understood that dryer appliance 10 is provided by way of example only. Other dryer appliances or laundry appliances having different configurations, different appearances, and/or different features may also be utilized with the present subject matter as well. For example, the present subject matter may be employed in vented dryer appliances utilizing gas or electric heaters or heat pump-based dryer appliances that circulate air in a closed loop. Other exemplary laundry appliances may include, for example, combination washer/dryer appliances.

Now that the construction of dryer appliance 10 and the configuration of controller 84 according to exemplary embodiments have been presented, exemplary methods of operating a dryer appliance will be described. Although the discussion below refers to the exemplary methods of operating dryer appliance 10, one skilled in the art will appreciate that the exemplary methods are applicable to the operation of a variety of other laundry appliances. In exemplary embodiments, the various method steps as disclosed herein may be performed by controller 84, by a separate, dedicated controller, by remote server 104, or combinations thereof.

Figure 3:
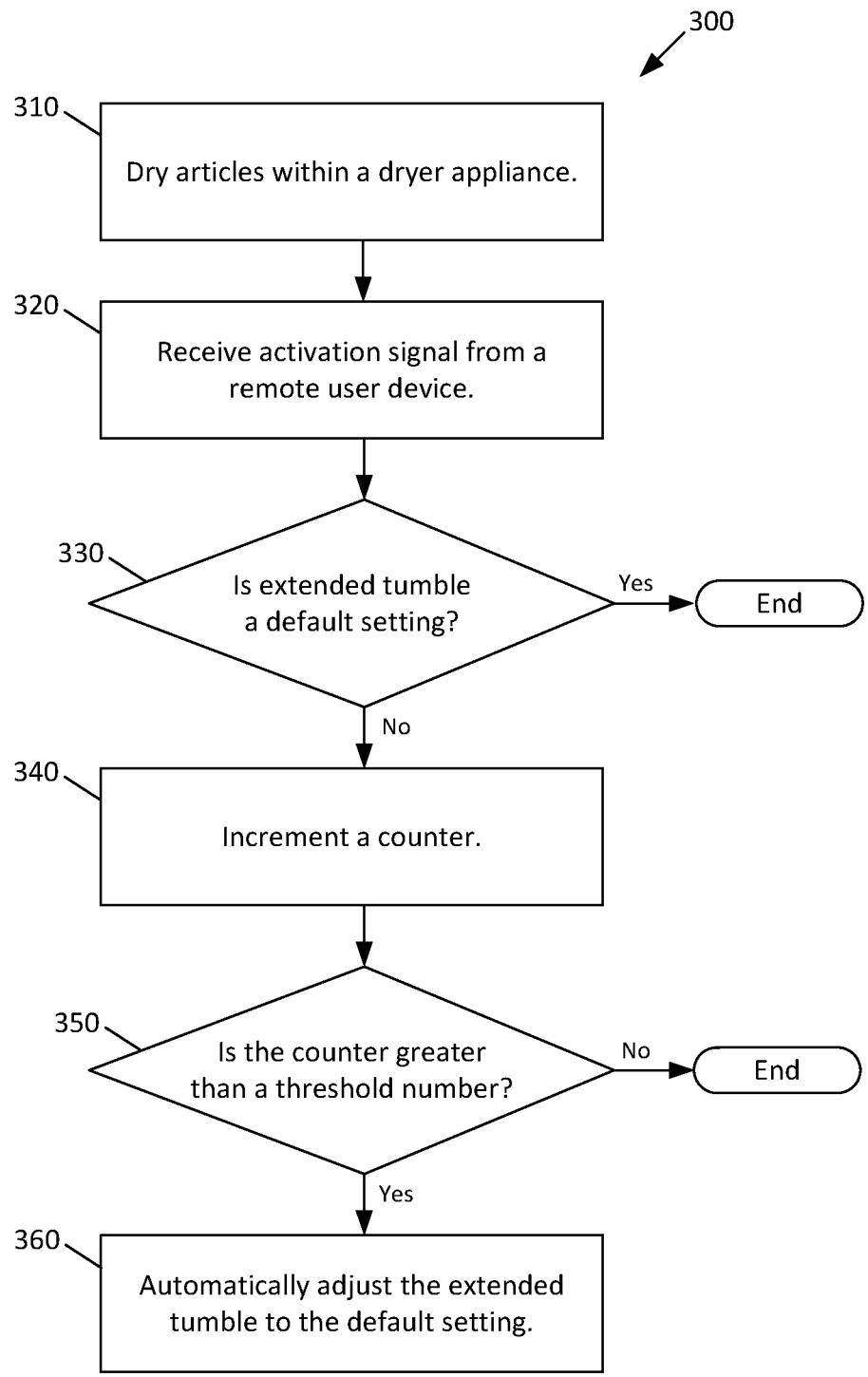
FIG. 3 illustrates a method for a method for operating a dryer appliance according to an example embodiment of the present disclosure.

Referring generally to FIG. 3, a method 300 of operating a laundry appliance, such as dryer appliance 10, is provided. Method 300 may be implemented on controller 84 and/or remote server 104. As discussed in greater detail below, method 300 may assist with improving operation of dryer appliance 10. Method 300 may assist with identifying when an extended tumble is frequently activated by a user on a remote user device away from dryer appliance 10 and assisting the user with more efficiently activating the extended tumble.

According to exemplary embodiments, at 310, method 300 includes drying articles within drum 26 of dryer appliance 10. For instance, as described above, drum motor 27 may operate to rotate drum 26, air handler 32 may operate to draw air through chamber 28 of drum 26, and heating assembly 50 may heat the air entering chamber 28 of drum 26. The heated air within drum 26 may remove moisture from damp articles disposed within chamber 28 at 310 in order to dry the articles.

At 320, after drying the articles at 310, data corresponding to an activation signal for an extended tumble may be received from a remote user device. For example, the user may utilize remote device 102 to input a command to activate the extended tumble, and the activation signal for the extended tumble may be transmitted from remote device 102 to controller 84 of dryer appliance 10 via network 106. In particular, controller 84 may transmit data corresponding to a drying cycle complete message to remote device 102 via network 106 after the articles within dryer appliance 10 are dried at 310. The drying cycle complete message may indicate to the user that the articles within drum 26 of dryer appliance 10 are dry. The user may be available to immediately remove the dried articles from dryer appliance 10 after 310. Conversely, the user may be away from dryer appliance 10 or otherwise unavailable to immediately remove the dried articles from dryer appliance 10 after 310. When the user is unavailable to immediately remove the dried articles from dryer appliance 10 after 310 or otherwise wants to wait to remove the dried articles from dryer appliance 10, the user may utilize remote device 102 to input the command to activate the extended tumble, and the activation signal for the extended tumble may be transmitted from remote device 102 to controller 84 of dryer appliance 10 via network 106. Thus, the user may manually activate the extended tumble when the user is located remotely from dryer appliance 10 using remote device 102.

The extended tumble may assist preventing or limiting undesirable resting and wrinkling of the dried articles in dryer appliance 10 after 310. When operating in the extended tumble, drum motor 27 may, e.g., continuously or periodically, operate to rotate drum 26 and thus tumble the dried articles in dryer appliance 10. The air handler 32 and heating assembly 50 may be deactivated during the extended tumble in order to reduce the energy consumption of dryer appliance 10 during the extended tumble. However, it will be understood that the air handler 32 and heating assembly 50 may be periodically activated during the extended tumble in order to assist with preventing or limiting undesirable resting and wrinkling of the dried articles in dryer appliance 10 in certain example embodiments. As may be seen from the above, in response to receiving the activation signal from remote device 102 at 320, controller 84 may initiate the extended tumble, and controller 84 may activate or continue to operate drum motor 27 to rotate drum 26 during the extended tumble in order to tumble the dried articles in dryer appliance 10 during the extended tumble, e.g., until the user is available to remove the dried articles in dryer appliance 10.

At 330, it may be determined whether the extended tumble is a default setting for dryer appliance 10. For example, controller 84 may be configured to automatically activate the extended tumble after each load of articles is dried in dryer appliance 10. Thus, at 330, method 300 may include automatically activating the extended tumble when the extended tumble is the default setting for dryer appliance 10, and method 300 may terminate in response to determining that the extended tumble is the default setting for dryer appliance 10 at 330. Conversely, method 300 continues to 340 in response to determining that the extended tumble is not the default setting for dryer appliance 10 at 330.

At 340, after determining that the extended tumble is not the default setting for dryer appliance 10 at 330, a counter may be incremented. For instance, controller 84 may increment the counter at 340 in response to determining that the extended tumble is not the default setting for dryer appliance 10 at 330. The counter may track a number of instances for which the user manually activates the extended tumble via the remote device 102 and the extended tumble is not the default setting for dryer appliance 10. Thus, method 300 may be repeated each time that articles are dried within drum 26 at 310.

At 350, it may be determined whether the counter is greater than a threshold number. As noted above, the counter may track the number of instances for which the user manually activates the extended tumble via the remote device 102 and the extended tumble is not the default setting for dryer appliance 10. When the counter is greater than the threshold number, it may be that the user is not aware of the default setting. In other words, the user may assume that the extended tumble must be manually activated via the remote device 102 and/or selector inputs 80. When the counter is not greater than the threshold number, method 300 may terminate and wait for additional operating cycles of dryer appliance 10 to further increment counter. The threshold number may be a suitable number. For instance, the threshold number may be no less than three (3) and no more than twenty (20) in certain example embodiments. As a particular example, the threshold number may be about five (5), about ten (10), about fifteen (15), etc.

At 360, the default setting for dryer appliance 10 may be automatically adjusted to the extended tumble. For example, controller 84 may change the default setting for dryer appliance 10 to the extended tumble such that controller 84 implements the extended tumble after each cycle in which dryer appliance 10 dries articles within drum 26 of dryer appliance 10. Thus, the user may no longer be required to manually activate the extended tumble via the remote device 102 and/or selector inputs 80 after articles are dried within drum 26 of dryer appliance 10 because the default setting for dryer appliance 10 is the extended tumble and controller 84 automatically implements the extended tumble after each cycle in which dryer appliance 10 dries articles within drum 26 of dryer appliance 10.

As shown above, method 300 may assist with identifying when the extended tumble is frequently activated by a user on a remote user device away from dryer appliance 10. Method 300 may also assist the user with more efficiently activating the extended tumble, e.g., by eliminating the need to manually activate the extended tumble after each drying cycle.

Method 300 may also include, after 360, transmitting data corresponding to a notification of the default setting adjustment to remote device 102. For example, after adjusting the default setting for dryer appliance 10 to the extended tumble at 360, controller 84 may transmit the notification of the default setting adjustment to remote device 102. The notification of the default setting adjustment may inform the user that the default setting for dryer appliance 10 is the extended tumble and that the extended tumble is automatically implemented after each cycle in which dryer appliance 10 dries articles within drum 26 of dryer appliance 10. Thus, the user may be informed that the user is no longer be required to manually activate the extended tumble via the remote device 102 and/or selector inputs 80 after articles are dried within drum 26 of dryer appliance 10.

Method 300 may also allow the user to opt out of the default setting adjustment at 360. For example, method 300 may also include readjusting the extended tumble to not the default setting for dryer appliance 10 in response to receiving data corresponding to an adjustment cancellation from remote device 102. For example, the user may be informed of the change in the default setting for dryer appliance 10 to the extended tumble via the notification of the default setting adjustment, and the user may prefer to manually activate the extended tumble on demand. Thus, the user may utilize remote device 102 to input a command to deactivate the extended tumble default adjustment, and the adjustment cancellation for the extended tumble may be transmitted from remote device 102 to controller 84 of dryer appliance 10 via network 106.

Figure 4:
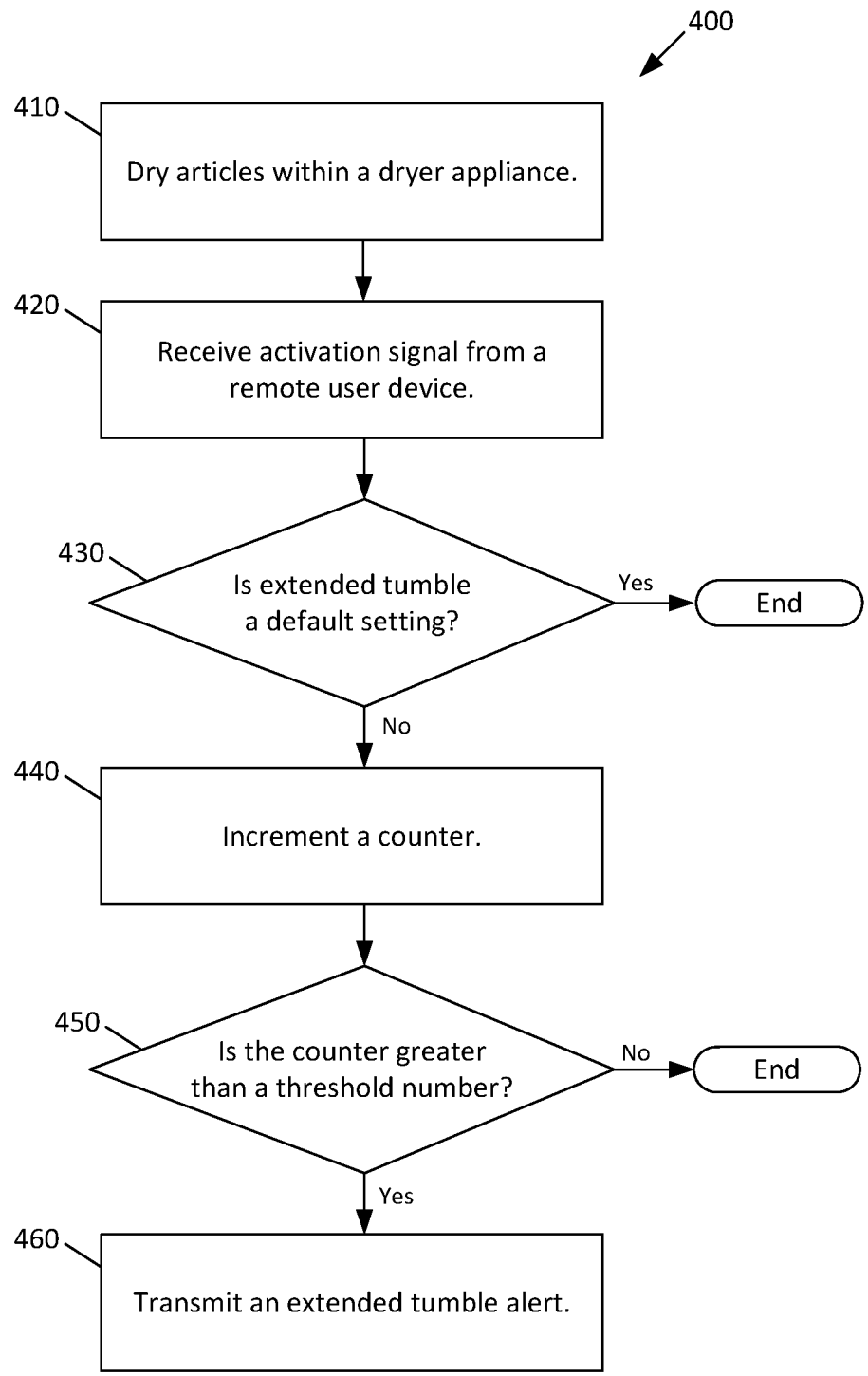
FIG. 4 illustrates a method for a method for operating a dryer appliance according to another example embodiment of the present disclosure.

Referring generally to FIG. 4, a method 400 of operating a laundry appliance, such as dryer appliance 10, is provided. Method 400 may be implemented on controller 84 and/or remote server 104. As discussed in greater detail below, method 400 may assist with improving operation of dryer appliance 10. Method 400 may assist with identifying when an extended tumble is frequently activated by a user on a remote user device away from dryer appliance 10 and assisting the user with more efficiently activating the extended tumble. Method 400 include similar steps as method 300 (FIG. 3) and such similar steps are not described in greater detail below for the sake of brevity. Rather, the description of method 400 provided below focuses on certain differences between method 400 and method 300.

As shown in FIG. 4, at 460, method 400 includes transmitting data corresponding to an extended tumble alert that suggests adjusting the default setting for dryer appliance 10 when the counter is greater than the threshold number. The extended tumble alert may inform the user that the default setting for dryer appliance 10 may be adjusted to the extended tumble, e.g., such that the extended tumble is automatically implemented after each cycle in which dryer appliance 10 dries articles within drum 26 of dryer appliance 10. Thus, the user may be informed that the user will no longer be required to manually activate the extended tumble via the remote device 102 and/or selector inputs 80 after articles are dried within drum 26 of dryer appliance 10 by adjusting the default setting for dryer appliance 10 to the extended tumble. Controller 84 may transmit the extended tumble alert to display 86 or remote device 102 at 460.

Method 400 may also include receiving data corresponding to an adjustment signal from selector inputs 80 or remote device 102. For example, after transmitting the extended tumble alert at 460, the user may utilize selector inputs 80 or remote device 102 to input a command to generate the adjustment signal. In response to the adjustment signal, the extended tumble may be adjusted to the default setting for dryer appliance 10. For example, controller 84 may change the default setting for dryer appliance 10 such that controller 84 implements the extended tumble after each cycle in which dryer appliance 10 dries articles within drum 26 of dryer appliance 10. Thus, the user may no longer be required to manually activate the extended tumble via the remote device 102 and/or selector inputs 80 after articles are dried within drum 26 of dryer appliance 10 because the default setting for dryer appliance 10 is the extended tumble and controller 84 automatically implements the extended tumble after each cycle in which dryer appliance 10 dries articles within drum 26 of dryer appliance 10.

Figure 5:
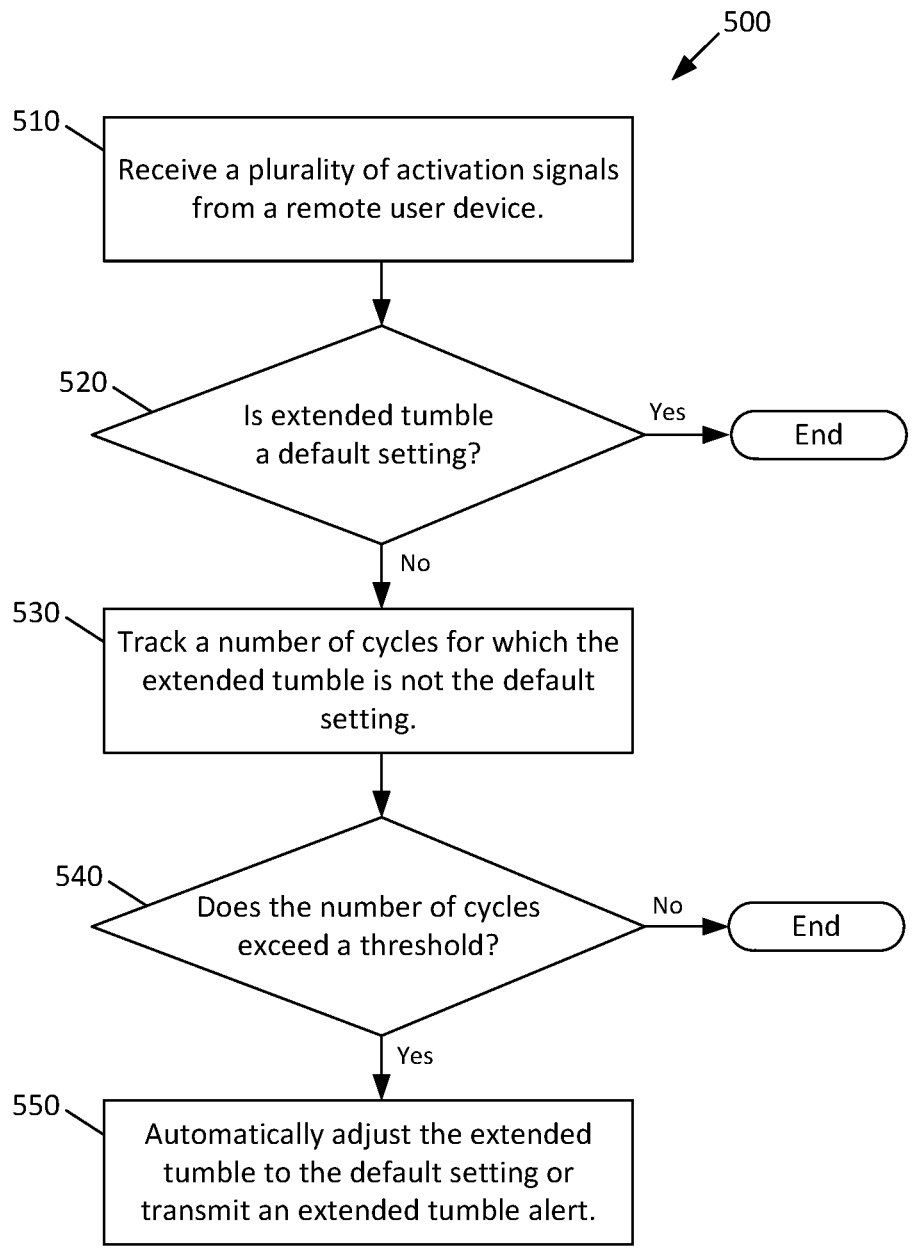
FIG. 5 illustrates a method for a method for operating a dryer appliance according to an additional example embodiment of the present disclosure.

Referring generally to FIG. 5, a method 500 of operating a laundry appliance, such as dryer appliance 10, is provided. Method 500 may be implemented on controller 84 and/or remote server 104. As discussed in greater detail below, method 500 may assist with improving operation of dryer appliance 10. Method 500 may assist with identifying when an extended tumble is frequently activated by a user on a remote user device away from dryer appliance 10 and assisting the user with more efficiently activating the extended tumble. Method 500 include similar steps as method 300 (FIG. 3) and/or method 400 (FIG. 4) and such similar steps are not described in greater detail below for the sake of brevity. Rather, the description of method 500 provided below focuses on certain differences between method 500 and method 300 and/or method 400.

As shown in FIG. 5, at 510, data corresponding to a plurality of activation signals for an extended tumble may be received from remote device 102, e.g., over time. For example, each time that a user activates the extended tumble with remote device 102, data corresponding to a respective one of the plurality of activation signals may be received from remote device 102. Thus, each time that the user utilizes remote device 102 to input a command to activate the extended tumble, the activation signal for the extended tumble may be transmitted from remote device 102 to controller 84 of dryer appliance 10 via network 106.

At 530, after determining that the extended tumble is not the default setting for dryer appliance 10 at 520, a number of cycles for which the extended tumble is not the default setting for dryer appliance 10 is tracked. For example, a counter may be used as described above for methods 300, 400. As another example, a percentage of total cycles for which the user remotely activates the extended tumble using remote device 102 without the extended tumble being the default setting may be determined. When the percentage of total cycles for which the user remotely activates the extended tumble using remote device 102 without the extended tumble being the default setting exceeds a threshold, method 500 may automatically adjust or suggest adjustment of the default setting of dryer appliance 10 to include the extended tumble, as described above.

FIGS. 3 through 5 depict steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure. Moreover, although aspects of methods 300, 400, 500 are explained using dryer appliance 10 as an example, it should be appreciated that these methods may be applied to the operation of any suitable laundry appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a dryer appliance, comprising:
    after drying articles within the dryer appliance, receiving data corresponding to an activation signal for an extended tumble from a remote user device at a controller of the dryer appliance, wherein the remote user device is separate from the dryer appliance,
    implementing the extended tumble in response to receiving the data corresponding to the activation signal for the extended tumble, wherein implementing the extended tumble comprises directing operation of a drum motor configured for rotating a drum of the dryer appliance;
    determining whether the extended tumble is a default setting for the dryer appliance;
    in response to determining that the extended tumble is not the default setting for the dryer appliance, incrementing a counter; and
    automatically adjusting the extended tumble to the default setting for the dryer appliance when the counter is greater than a threshold number.

2. The method of claim 1, wherein the activation signal for the extended tumble is received from the remote user device via a network.

3. The method of claim 1, further comprising, after automatically adjusting the extended tumble to the default setting for the dryer appliance, transmitting data corresponding to a notification of the default setting to the remote user device.

4. The method of claim 3, further comprising readjusting the extended tumble to not the default setting for the dryer appliance in response to receiving data corresponding to an adjustment cancellation from the remote user device.

5. A method for operating a dryer appliance, comprising:
after drying articles within the dryer appliance, receiving data corresponding to an activation signal for an extended tumble from a remote user device at a controller of the dryer appliance, wherein the remote user device is separate from the dryer appliance;
implementing the extended tumble in response to receiving the data corresponding to the activation signal for the extended tumble, wherein implementing the extended tumble comprises directing operation of a drum motor configured for rotating a drum of the dryer appliance;
determining whether the extended tumble is a default setting for the dryer appliance;
in response to determining that the extended tumble is not the default setting for the dryer appliance, incrementing a counter; and
transmitting data corresponding to an extended tumble alert that suggests adjusting the default setting for the dryer appliance when the counter is greater than a threshold number.

6. The method of claim 5, wherein the activation signal for the extended tumble is received from the remote user device via a network.

7. The method of claim 5, wherein the data corresponding to the extended tumble alert is transmitted to the remote user device.

8. The method of claim 7, further comprising:
receiving data corresponding to an adjustment signal from the remote user device; and
adjusting the extended tumble to the default setting for the dryer appliance in response to receiving the data corresponding to the adjustment signal from the remote user device.

9. The method of claim 5, wherein the data corresponding to the extended tumble alert is transmitted to a user interface on the dryer appliance.

10. The method of claim 9, further comprising:
receiving data corresponding to an adjustment signal from the user interface on the dryer appliance; and
adjusting the extended tumble to the default setting for the dryer appliance in response to receiving the data corresponding to the adjustment signal from the user interface on the dryer appliance.

11. A method for operating a dryer appliance, comprising:
receiving data corresponding to a plurality of activation signals for an extended tumble from a remote user device at a controller of the dryer appliance, each of the plurality of activation signals received after a respective cycle during which articles are dried within the dryer appliance, wherein the remote user device is separate from the dryer appliance;
implementing the extended tumble in response to receiving the data corresponding to the activation signal for the extended tumble, wherein implementing the extended tumble comprises directing operation of a drum motor configured for rotating a drum of the dryer appliance;
determining whether the extended tumble is a default setting for the dryer appliance;
in response to determining that the extended tumble is not the default setting for the dryer appliance, tracking a number of cycles for which the extended tumble is not the default setting for the dryer appliance; and
after the number of the cycles for which the extended tumble is not the default setting for the dryer appliance exceeds a threshold, either automatically adjusting the extended tumble to the default setting for the dryer appliance or transmitting data corresponding to an extended tumble alert that suggests adjusting the default setting for the dryer appliance.

12. The method of claim 11, wherein each of the plurality of activation signals is received from the remote user device via a network.

13. The method of claim 11, further comprising, after automatically adjusting the extended tumble to the default setting for the dryer appliance, transmitting data corresponding to a notification of the default setting to the remote user device.

14. The method of claim 13, further comprising readjusting the extended tumble to not the default setting for the dryer appliance in response to receiving data corresponding to an adjustment cancellation from the remote user device.

15. The method of claim 11, wherein the data corresponding to the extended tumble alert is transmitted to the remote user device.

16. The method of claim 15, further comprising:
receiving data corresponding to an adjustment signal from the remote user device; and
adjusting the extended tumble to the default setting for the dryer appliance in response to receiving the data corresponding to the adjustment signal from the remote user device.

17. The method of claim 11, wherein the data corresponding to the extended tumble alert is transmitted to a user interface on the dryer appliance.

18. The method of claim 17, further comprising:
receiving data corresponding to an adjustment signal from the user interface on the dryer appliance; and
adjusting the extended tumble to the default setting for the dryer appliance in response to receiving the data corresponding to the adjustment signal from the user interface on the dryer appliance.

* * * * *